United States Patent [19]
Lacchia

[11] Patent Number: 5,681,390
[45] Date of Patent: Oct. 28, 1997

[54] SPRAY BOOTH WITH A MAGNETIC CLEANING SCRAPING BAR

[75] Inventor: Adrien Lacchia, Saint Martin le Vinoux, France

[73] Assignee: Sames S.A., Meylan, France

[21] Appl. No.: 512,921

[22] Filed: Aug. 9, 1995

[30] Foreign Application Priority Data

Sep. 16, 1994 [FR] France ................................ 94 11341

[51] Int. Cl.⁶ ............................... B05B 1/28; B05B 15/12
[52] U.S. Cl. ........................ 118/326; 118/309; 118/DIG. 7
[58] Field of Search ................................... 118/309, 326, 118/634, DIG. 7; 134/9; 454/50; 15/93.1, 97.1, 98, 250.28, 250.11

[56] References Cited

U.S. PATENT DOCUMENTS 4,294,191 10/1981 Lööf.
4,715,314 12/1987 Ramseier et al..
4,977,637 12/1990 Demers ........................... 15/104 R
5,105,501 4/1992 Douglas .......................... 15/250.28
5,346,553 9/1994 Pingel ............................. 118/309

FOREIGN PATENT DOCUMENTS

0200681 11/1986 European Pat. Off..
2675061 10/1992 France.

Primary Examiner—Donald E. Czaja
Assistant Examiner—Steven B. Leavitt
Attorney, Agent, or Firm—Loeb & Loeb LLP

[57] ABSTRACT

A spray booth in which objects are coated by spraying with a finely divided coating material, the booth including: a housing composed of a ceiling which has a lower surface, a plurality of walls each having an inner surface and a floor, the surfaces delimiting a spray space; a system for recovering finely divided material not deposited on the objects; at least one scraping bar for scraping finely divided material off of at least one surface selected from the lower surface and an inner surface; and an operating mechanism for supporting and displacing the scraping bar along the at least one surface. The booth is scraped by first scraping one of the lower surfaces of the ceiling and the inner surface of at least one of the walls, and then scraping the floor.

13 Claims, 6 Drawing Sheets

SPRAY BOOTH WITH A MAGNETIC CLEANING SCRAPING BAR

BACKGROUND OF THE INVENTION

The present invention relates to a booth for coating objects by spraying with a finely divided material, particularly for applying, by electrostatic means, a layer of thermoplastic paint in the form of powder on such objects, before transforming this layer of powder into a durable coating by heating of the objects. It concerns more particularly an arrangement permitting recovery of a part of the powder which is not deposited on the objects and which otherwise comes to cover the floor, ceiling and walls of the booth. The invention also concerns a rapid cleaning process for such a booth.

In a powder spray booth of the type indicated hereabove, the powder which is not deposited on the objects and which is not drawn along by the exhaust and recycling systems provided on the lateral walls of the booth accumulates on the ceiling, walls and floor of the booth. The powder which accumulates on the floor can be evacuated toward recycling means by a known system, such as described, for example, in Applicant's French patent document A-2675061. Certain installations are provided for spraying several materials having different colors or different mechanical and chemical properties. In this case, it is imperative to clean the totality of the interior of the booth at the time of product changes in order to prevent the mixing of different products in the powder recovery systems. Provision has on occasion been made to clean a booth with a carriage suspended from rails and carrying brushes or cloths which rub against the walls, the ceiling and the floor. Such a system is described, for example, in European patent document 200681. This requires interruption of the spraying for a significant period of time because it is necessary to displace an entire carriage. It also requires the construction of a specific supplementary transport conveyor and storage of the carriage, which, in addition to the cost of the carriage itself, substantially increases the cost of the installation. In addition, the carriage is displaced in the direction of conveyance of the objects to be coated and there is a risk that it will collide with an edge of the windows arranged in the walls of the booth, which will damage the cleaning elements, brushes or cloths, and trigger the safety system because of the blockage of the carriage.

Finally, in systems utilizing a carriage for simultaneously cleaning the ceiling, walls and floor of a booth, the powder which is dislodged from the ceiling and the walls forms a cloud which is not immediately deposited on the floor. A portion of the powder falls onto the floor after passage of the carriage and this substantially reduces the cleaning efficiency. In practice, in an installation capable of projecting several materials which should not be mixed, it is necessary to executed several back and forth movements of the carriage, which prolongs the period of interruption of the spray painting.

SUMMARY OF THE INVENTION

It is an object of the present invention to resolve the totality of these problems.

A more specific object of the invention is to simplify and expedite the cleaning of such spray booths and the recovery of unused powder.

The above and other objects are achieved, according to the invention, by a spray booth in which objects are coated by spraying with a finely divided coating material, the booth comprising: a housing composed of a ceiling which has a lower surface, a plurality of walls each having an inner surface and a floor, the surfaces delimiting a spray space; means for recovering finely divided material not deposited on the objects; at least one scraping bar for scraping finely divided material off of at least one surface selected from the lower surface and an inner surface; and operating means for supporting and displacing the scraping bar along the at least one surface, wherein the operating means comprise at least one mobile element disposed outside of the housing, and magnetic coupling means for releasably coupling the scraping bar to the mobile element.

The invention permits the utilization of the scraping system in an easy manner and at times selected by the operator, including, in certain cases, during spray painting. In particular, each scraping bar is displaced in translation by a mobile element or elements to which it is coupled by magnetic coupling means constituted by magnets. This permits a rapid positioning of the scraping bar or bars in the booth, which implies a substantial time saving during cleaning, i.e. for example during coating product, or color, changes. In certain configurations, in the absence of a coating product change, it is even possible to operate the scraping bar or bars during spray painting phases because there is no interference with the conveyor which transports the objects to be coated. This also permits a time saving and one can envision having the scraping system placed into operation automatically at regular intervals. Finally, when it is necessary to remove a scraping bar from the booth, at the end of a cleaning phase or for a maintenance operation, it is only necessary to overcome the attracting force of the magnets.

The invention also provides a process for cleaning a booth for spray coating of objects with finely divided material, of the type in which the objects are caused to cross a spray space defined by a ceiling, walls and a floor, characterized in that the ceiling or the walls are cleaned by scraping, and that the floor is cleaned by scraping after cleaning of the ceiling and/or walls.

The process according to the invention assures that powder will first fall from the ceiling, and then from the walls, toward the floor of the booth which is cleaned by a scraping bar that removes at the same time the powder which was originally deposited on the ceiling, the walls and the floor.

The process can also consist in installing displaceable scraping bars in a removable manner in the booth on internal surfaces of the ceiling and/or walls. It can finally consist in utilizing a single displaceable scraping bar alternatively on the internal surface of the ceiling and/or of the walls and/or of the floor.

These various processes permit a saving of time during the cleaning phases and only require the operator to perform simple and easy tasks since the objects which must be manipulated are light and relatively noncumbersome. The investments necessary to provide means for carrying out the methods is small, which renders the procedure economically attractive.

The invention will be better understood and other advantages thereof will appear more clearly from the following description of four embodiments of a booth for coating objects by spraying finely divided material according to the principle of the invention, the embodiments being described purely by way of nonlimiting example and with reference to the attached drawings.

DESCRIPTION OF THE PREFERRED EMBODIMENTS

Figure 1:
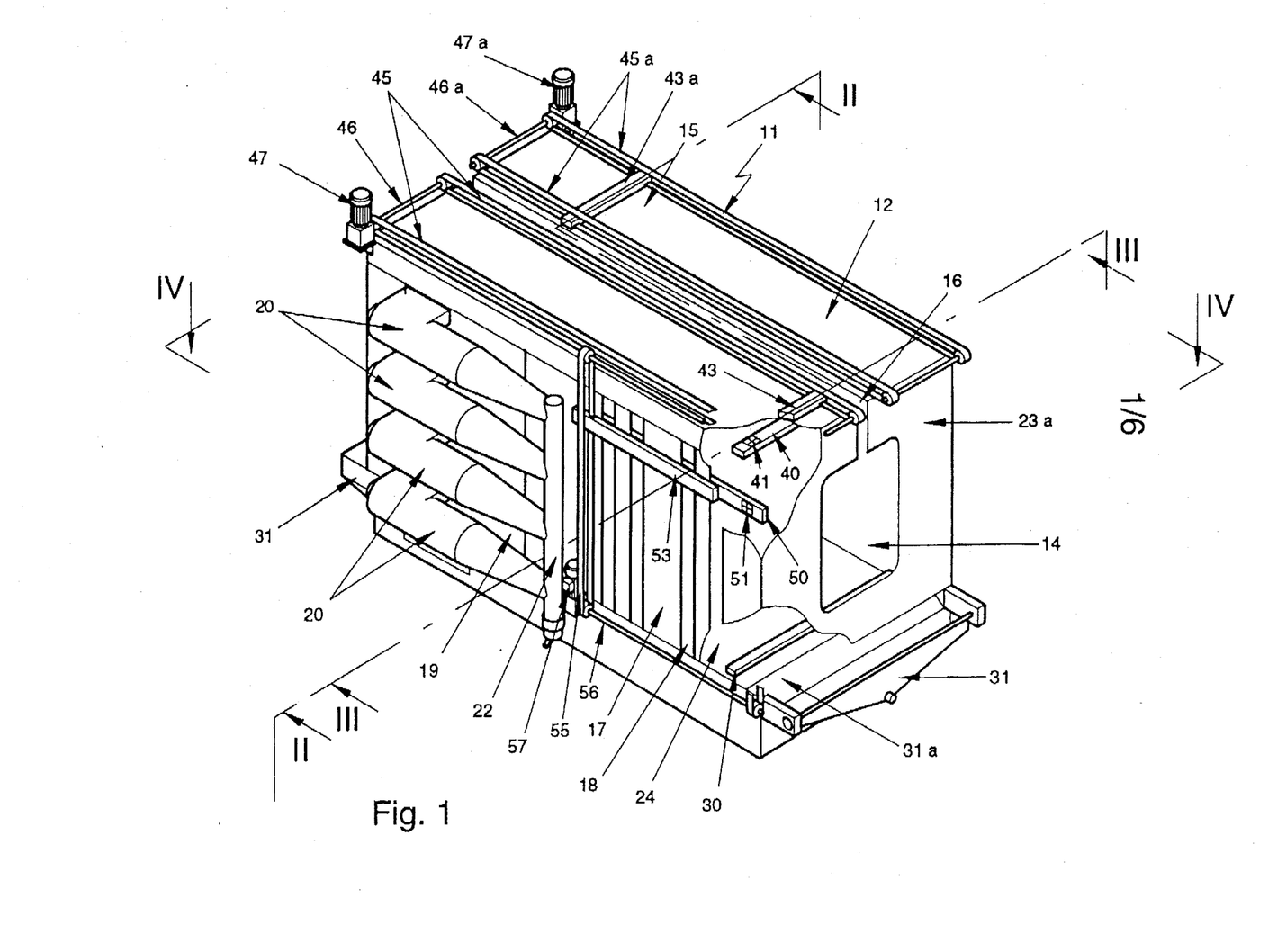
FIG. 1 is a perspective view, which is partly broken away, showing a booth according to an embodiment of the invention.

Referring particularly to FIG. 1, there is shown a booth 11 in which objects are to be coated with a product which is sprayed in powder form. Booth 11 is constituted by a box 1 having the general form of a rectangular parallelepiped, and provided with an entrance opening 13 (visible in FIG. 2) and an exit opening 14 for passage of objects to be coated, openings 13 and 14 being formed in respective end walls 23 (FIG. 2) and 23a. A narrow longitudinal opening 16 is arranged in ceiling 15 of box 12 and partially in walls 23 and 23a for the passage of object carriers, or gliders, which are displaced along an overhead conveyor, these components being conventional and not being illustrated. Each lateral wall 17 and 17a of box 12 is provided with slots 18, in the illustrated embodiment arranged vertically, for the passage of supports for the coating product sprayers. These elements are also conventional and are not illustrated.

In front of slots 18 in each wall 17, 17a, and along the respectively opposite wall, there is installed a suction hood 19 connected by conventional extractors 20, of the cyclone type, to a recycling collector 22. One part of the powdered coating product which is not deposited on the objects to be coated thus crosses the booth in a transverse direction before being aspirated by an associated hood 19, and then recycled. Box 12 is provided with a flat floor 24, which is substantially rectangular. When objects are sprayed within booth 11, powder which is not deposited on the objects to be coated ends up being deposited on ceiling 15, walls 17 and floor 24.

A scraping bar 30 is arranged to be displaced alternatingly in translation between the openings of two powder recovery hoppers 31 situated at opposite ends of box 12, each hopper 31 having a transverse opening 31a in the form of a slot 31a within box 12 and at the same level as floor 24. Only one opening 31a is visible in the drawing. Brushes, or any other equivalent scraping means, such as elastomeric scrapers or felt pads, or comparable scraping elements, are mounted on bar 30.

Figure 2:
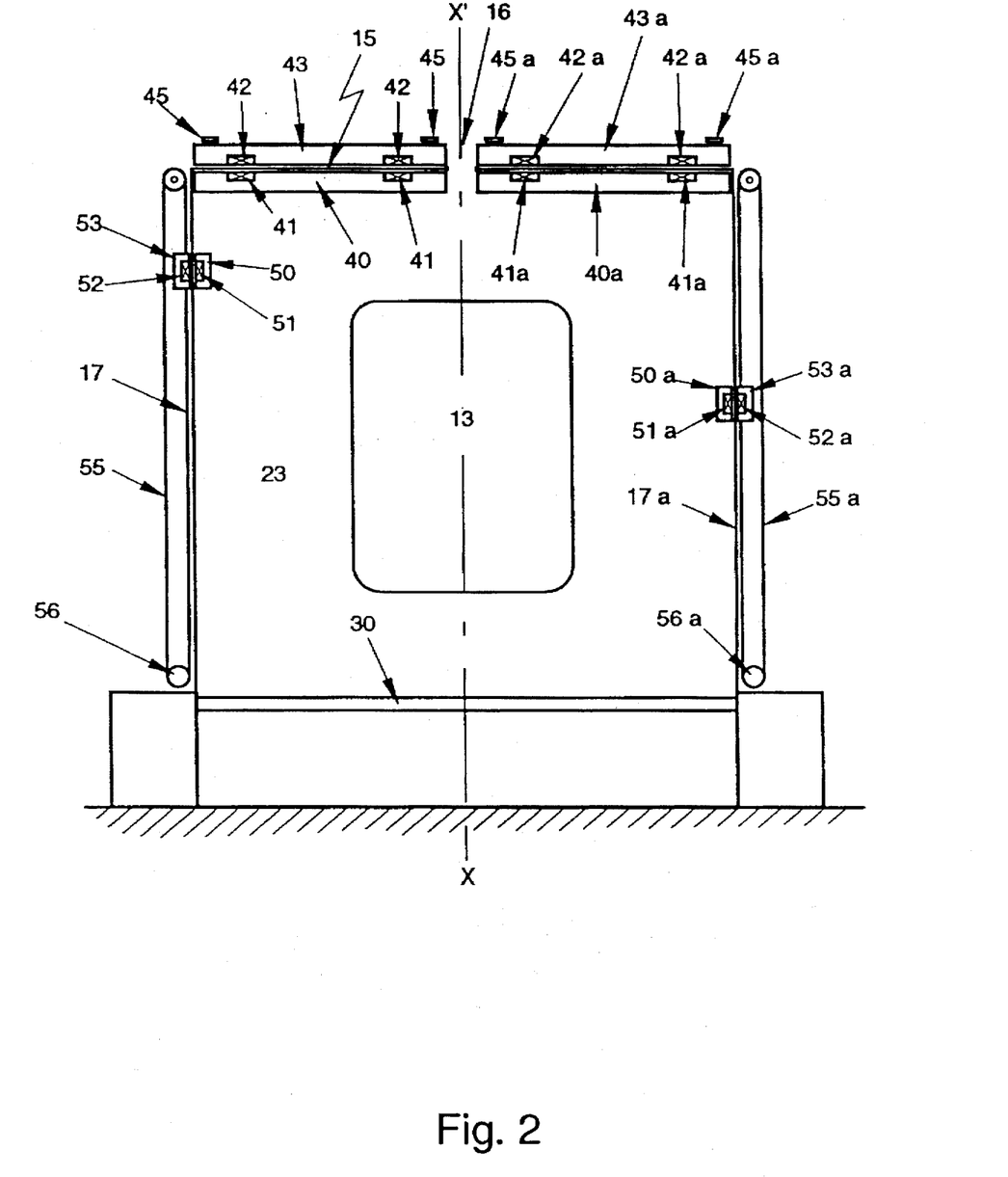
FIG. 2 is a cross-sectional view taken along line II—II of FIG. 1.

According to the invention, a scraping bar 40 can be mounted on the left portion of the internal, or lower, surface of ceiling 15, i.e. the part of the ceiling situated to the left of the axis x–x' of the conveyor shown in FIG. 2, held by the magnetic force of magnets 41, also visible in FIG. 2, which are embedded in bar 40 and disposed facing magnets 42, also visible in FIG. 2, carried by a mobile element 43. Ceiling 15 can be made of a nonmagnetic material, such as a type 316L stainless steel or a plastic material. Mobile element 43 is displaced in translation on the exterior, or upper, surface of ceiling 15 by notched, or toothed, belts 45 driven by an electric stepping motor 47 via a drive shaft 46. As desired by the operator, scraping bar 40 can be mounted or not during the spraying operations since its movements do not interfere in any respect with the system for transporting objects to be coated or with the movement of the coating product sprayers. A second scraping bar 40a can be mounted on the right-hand portion of ceiling 15, when viewed in the direction of FIG. 2. A mobile element 43a and its drive systems, of which the elements are identical to those of mobile element 43 and carry the same reference numerals with the suffix "a", are provided on the external, or upper, face of ceiling 15 located to the right of axis x–x' in FIG. 2.

Advantageously, if the scraping bars are not in continual use, one can utilize a single bar 40 which is mounted successively, or alternatingly, to the left and the right of axis x–x' of the conveyor. This reduces the cost of the apparatus and a reduction in the parts inventory.

A scraping bar 50 is driven along the internal surface of lateral wall 17 by a mobile element 53 to which scraping bar 50 is coupled by the force of magnets 51 and 52, with lateral wall 17 also being made of a nonmagnetic material. Mobile element 53 is displaced in translation on the exterior surface of lateral wall 17 by notched belts 55 driven by an electric stepping motor 57 via a drive shaft 56. Scraping bar 50 is displaced vertically along the internal surface of lateral wall 17, which enables it to bear permanently against the two longitudinal edges of slots 18. As in the case of the scraping bars associated with ceiling 12, use can be made of only one scraping bar 50 for the two walls 17 and 17a of the booth. A mobile element 53a and its drive system, whose elements are identical to those of mobile element 53 and carry the same reference numerals to which has been added the suffix "a", are provided on the external face of lateral wall 17a. A second scraping bar 50a can also be provided as shown in FIG. 2.

According to an advantageous variation which is not shown, scraping bars 40 and 50 can be arranged to not be removed from booth 11 at the end of cleaning operations but they can remain, for example at the end of their travel paths, in positions compatible with the movements of the sprayers and the conveyor. In this case, it is possible to provide a specific housing for these bars, this housing being capable of being closed by a protective lid or cover that will in particular prevent coating powder from infiltrating into the housing.

Mobile element 53 shown in FIG. 1 has a length corresponding substantially to one half of the length of booth 11 because of the obstacle presented by extractors 20. If necessary, one can however displace a scraping bar 50 whose length is substantially equal to that of booth 11 by providing a second mobile element driven by a belt in proximity to end walls 23. The displacement of the mobile elements for scraping bar 50 can be synchronized by shafts located above and below extractors 20.

The operation of the apparatus is the following: when it is necessary to clean the ceiling and walls of the booth, bar 40, or bars 40 and 40a are positioned by the operator in a manner such that magnets 41 and 41a are opposite magnets 42 and 42a carried by mobile elements 43 and 43a. The magnetic coupling forces overcome gravity and the scraping bars can be displaced by their respective mobile elements. The brushes of the scraping bars cause coating product powder to fall onto the walls and the floor of the booth. Then, the scraping bars can be removed simply by pulling them down to overcome the magnetic force. When it is necessary to clean walls 17 and 17a, one proceeds in a comparable manner. It will be noted that the device according to the invention permits cleaning of ceiling 15 before walls 17 and 17a, which gives powder which has been dislodged from the ceiling time to be deposited on the walls before they are scraped in order to dislodge powder from the walls and cause it to fall onto floor 24. After cleaning of the walls, scraping bar 30 mounted on the floor evacuates the recovered powder toward hoppers 31. The operation of scraping bar 30 can be maintained during the entire cleaning operation, which permits the powder to be continuously evacuated and avoids formation of too large a pile of powder on the floor.

Figure 3:
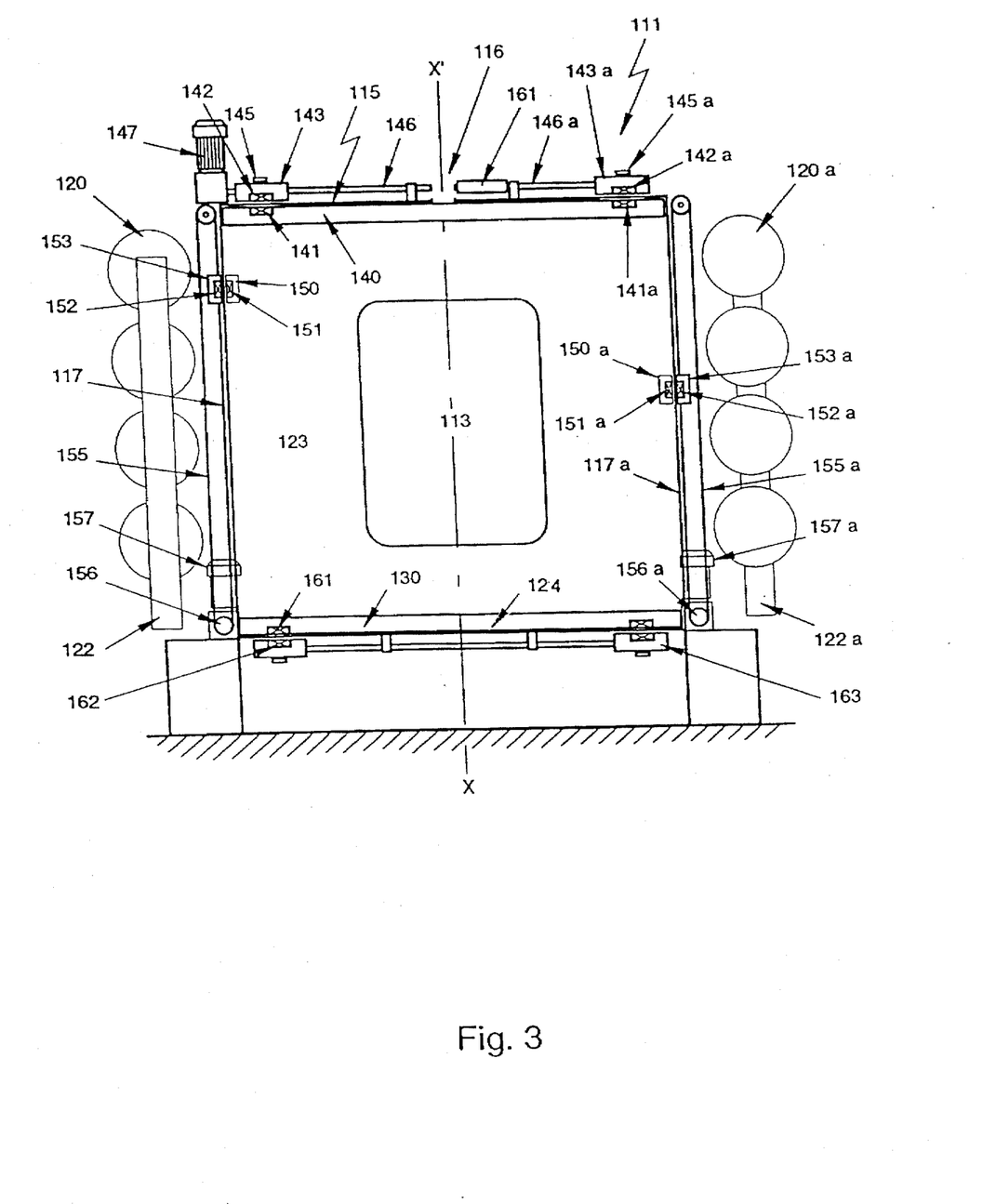
FIG. 3 is a cross-sectional view taken along the line III—III of FIG. 1 for a second embodiment of the invention.

The booth of FIG. 3 differs from that of FIGS. 1 and 2 in that a single scraping bar 140 is provided for cleaning the ceiling. Elements similar to those of FIGS. 1 and 2 have corresponding reference numerals increased by 100. Two mobile elements 143 and 143a are located on the external, or upper, face of ceiling 115 to one side and the other of opening 116, which permits the passage of conventional transport gliders for transporting objects to be coated through booth 11. They are displaced by belts 145 driven by a shaft 146 which is interrupted along a length equivalent to the width of opening 116 in order to leave a free passage for the transport gliders for the objects to be coated. Shaft 146 is driven by a motor 147, for example an electric stepping motor. Bearings support shaft 146 in proximity to opening 116. When it is necessary to clean the ceiling, conveyance of the objects is interrupted and a sleeve 161 is displaced above and across opening 116 to connect the two halves of shaft 146 which can thus drive in a synchronized manner the mobile elements 143 and 143a. According to a variation of the invention, which is not shown, driving of scraping bar 140 could take place by any equivalent system such as, for example, a single mobile unit having a length equal to the width of the booth and pivoting around a vertical axis close to one of its extremities in order to rest on one of the halves of ceiling 115 when the objects to be coated must travel through booth 111.

The length of scraping bar 140 is substantially equal to the width of the booth. The driving in translation of scraping bar 130 situated on the floor is effectuated by a mobile element 163 to which it is magnetically coupled by magnets 161 and 162. In this manner, it is possible to provide that scraping bar 140 will be able to participate in cleaning of ceiling 115 and floor 124 by taking the place of scraping bar 130. It is sufficient for the operator to position scraping bar 140 in place relative to the corresponding mobile element. It is also possible to provide for this same scraping bar 140 to be coupled to mobile elements 153 and 153a when it takes the place of bars 150 and 150a. Thus a single scraping bar can serve for cleaning the entire booth. There can advantageously be provided a single motor which will drive, for example by means of angle pulleys and clutches, each set of mobile elements to which scraping bar 140 can be coupled. As previously, the scraping of floor 124 takes place after scraping of ceiling 115 and walls 117.

Figure 4:
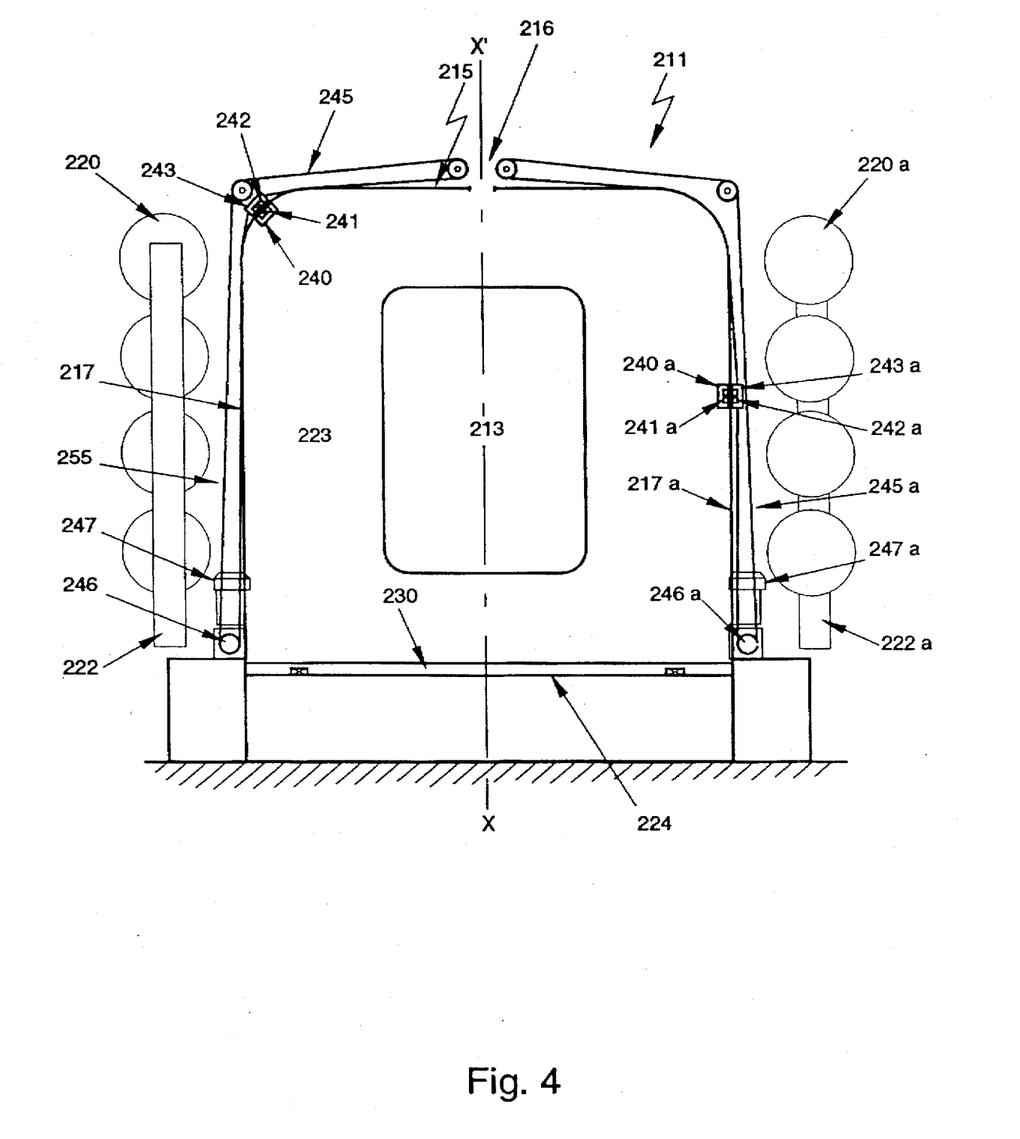
FIG. 4 is a view similar to that of FIG. 3 for a third embodiment of the invention.

The booth of FIG. 4 differs from that of FIGS. 1 and 2 in that a single scraping bar is provided for cleaning the ceiling and walls of the booth. Elements similar to those of FIGS. 1 and 2 carry corresponding reference numerals increased by 200. The mobile elements are parallel to the path of the objects to be coated in booth 211, in which the connection between ceiling 215 and walls 217 and 217a has a radius of curvature of the order of 15 cm. Drive belts 245 and 245a for mobile elements 243 and 243a are disposed in a manner to permit displacement of mobile elements 243 and 243a in a single pass along ceiling 215 and walls 217 and 217a. The external surface of the connection zone between ceiling 215 and walls 217 and 217a is treated to facilitate sliding of belts 245 and 245a.

A scraping bar 240, which is magnetically coupled to mobile element 243 or 243a, can thus clean the two corresponding internal surfaces of roof 215 and wall 217 or 217a. One scraping bar 240 could be placed alternatingly at the two sides of the axis x–x' or two scraping bars 240 and 240a functioning in unison can be provided. Since scraping bar 240 can execute several back and forth movements between a wall and the ceiling, it is not necessary to provide for cleaning the ceiling before the wall. On the other hand, the scraping bar 230 situated on floor 224 will be activated after cleaning of ceiling 215 and walls 217 and 217a to evacuate powder which has been dislodged by bars 240 and 240a. Scraping bars 240 and 240a can function during coating product spraying operations, at least on the part of their path of travel situated above the highest point of the path of travel of the sprayers.

A device equivalent to that of FIG. 4 can also be utilized with the booth of FIG. 3. In effect, if there is a rather large radius of curvature in the connection zone between ceiling 115 and walls 123 and 123a in which openings 113 and 114 are arranged, it is possible to cause the scraping bar to move from ceiling 115 toward each of the walls 123 and 123a. The mobile element 143 must then be provided. It is thus possible to clean, in a single translation movement, wall 123, ceiling 115 and wall 123a, several back and forth movements being possible.

Figure 5:
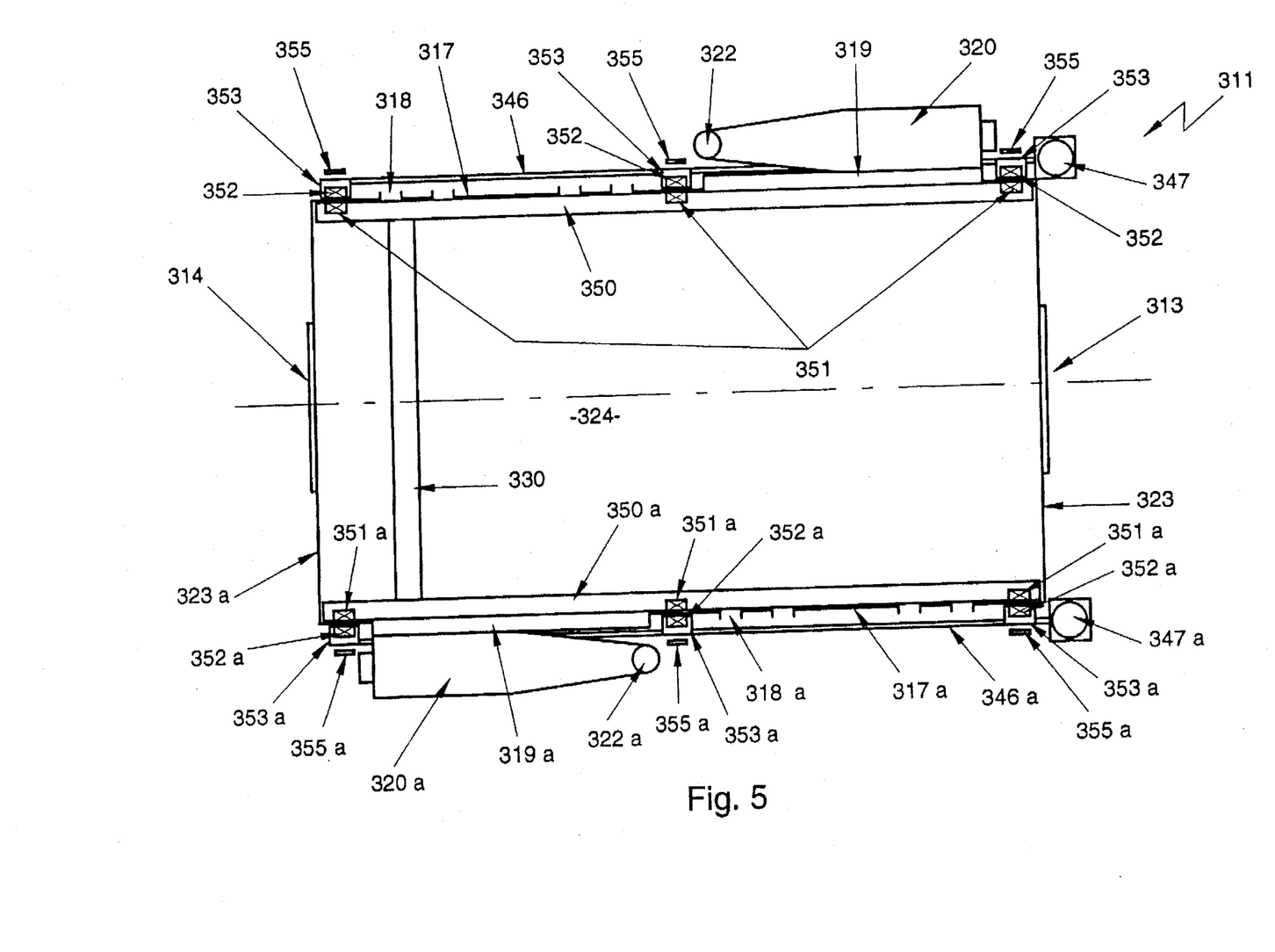
FIG. 5 is a cross-sectional view taken along the line IV—IV of FIG. 1 for a fourth embodiment of the invention.
Figure 6:
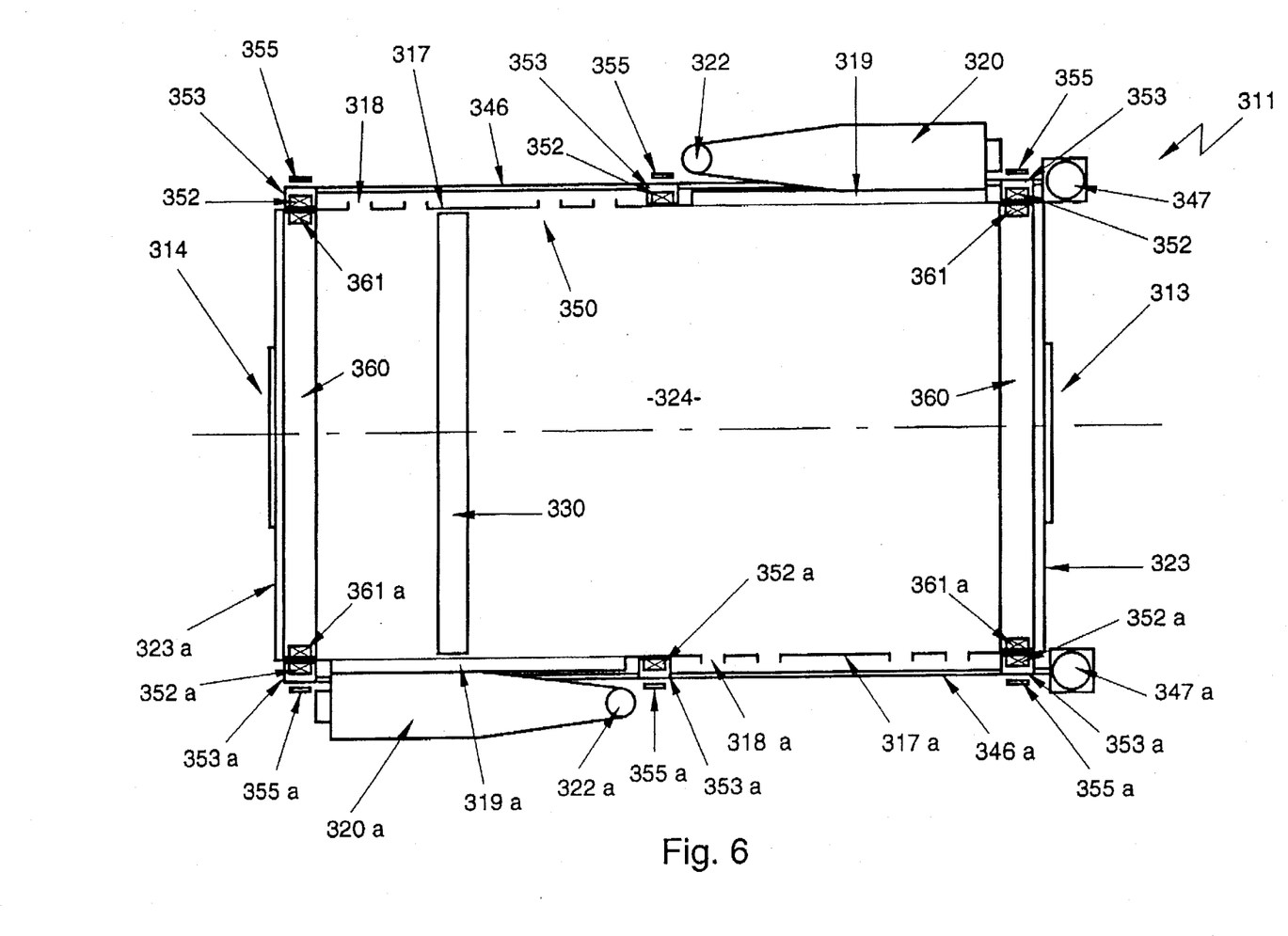
FIG. 6 is a view similar to that of FIG. 5, and of the same apparatus of FIG. 5, showing another working position of this apparatus.

The booths of FIGS. 5 and 6 differ from that of the figures previously described in that the mobile elements can displace, or entrain, several scraping bars intended to clean several walls. Elements similar to those of FIGS. 1 and 2 carry the same reference numerals increased by 300. Mobile element 353 is divided into three parts each driven by a belt. The obstruction represented by extractors 320 does not interfere with driving of a scraping bar whose length is substantially equal to that of the booth. A scraping bar 330 is also mounted on floor 324. Scraping bars 350 and 350a permit cleaning of walls 317 and 317a. When it is necessary to clean walls 323 and 323a, scraping bars 350 and 350a are removed and scraping bars 360 and 360a are put in place in the positions shown in FIG. 6. Magnets 361 and 361a which effect connection between bars 360 and mobile elements 353 and 353a are embedded in the longitudinal ends of scraping bars 360 and 360a, which permits the use of mobile elements which are also used to hold bars 350 and 350a. Thus, it is not necessary to provide additional mobile elements on the external faces of walls 323 and 323a; mobile elements 353 and 353a can thus displace, as desired, either scraping bars 350 and 350a or 360 and 360a.

Any drive system permitting translational movement of mobile elements, such as one or several jacks (piston-cylinder units), chains or other elements, can be utilized in the practice of the invention, and in particular use can be made of systems disclosed in French patent document A-2675061. The embodiments disclosed herein have vertical slots in the walls of the booth and scraping bars which undergo a vertical movement along the walls in order to rest at the same time along the two edges of each of the slots. In the case where these slots would be horizontal, for example to permit a lateral movement following the movement of the objects which pass through the booth, the corresponding scraping bar could be oriented vertically and displaced horizontally. The geometry and the dimensioning of the scraping bars can be adapted as a function of the location and obstruction provided by the ventilation systems which do not necessarily include cyclone type separators. All of these modifications are within the capability of one of ordinary skill in the art and would not be outside of the framework of the present invention.

It has been stated previously that cleaning of the ceiling and walls of the booth takes place before that of the floor or, inversely, that cleaning of the floor takes place after that of the ceiling and/or walls. Stated more broadly, cleaning of the floor ends after the end of cleaning of the ceiling and walls. Cleaning of the floor may have commenced before the beginning of, or during, or after completion of, cleaning of the ceiling and walls.

This application relates to subject matter disclosed in French Application number FR94.11341, filed on Sep. 16, 1994, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A spray booth in which objects are coated by spraying with a finely divided coating material, said booth comprising: a housing composed of a ceiling which has a lower surface, a plurality of walls each having an inner surface and a floor, the surfaces delimiting a spray space; means for recovering finely divided material not deposited on the objects; at least one scraping bar for scraping finely divided material off of at least one surface selected from the lower surface and an inner surface; and operating means for supporting and displacing said scraping bar along said at least one surface, wherein said operating means comprise at least one mobile element disposed outside of said housing, and magnetic coupling means for releasably coupling said scraping bar to said mobile element.

2. A spray booth as defined in claim 1 wherein said housing is constructed to permit the objects to be transported through the spray space.

3. A spray booth as defined in claim 2 wherein said operating means further comprise drive belts connected for displacing said mobile element.

4. A spray booth as defined in claim 3 wherein objects are coated while being displaced along a linear path through said spray booth and said drive belts are movable along paths parallel to the linear path.

5. A spray booth as defined in claim 3 wherein objects are coated while being displaced along a linear path through said spray booth and said drive belts are movable along paths perpendicular to the linear path.

6. A spray booth as defined in claim 2 wherein said magnetic coupling means comprise at least one first magnet carried by said mobile element and at least one second magnet carried by said scraping bar, said magnets facing one another when said scraping bar is in position for scraping material from said at least one surface.

7. A spray booth as defined in claim 2 wherein said mobile element is mounted adjacent said ceiling and said operating means are operative for displacing said scraping bar forward and back along said inner surface of said ceiling parallel to the direction of transport of objects through the spray space.

8. A spray booth as defined in claim 2 wherein at least one of said walls is provided with slots for passage of sprayers, each slot having two longitudinally extending edges, and said mobile element is mounted adjacent one of said walls and is arranged to displace said scraping bar to cause said scraping bar to always bear against both edges of each said slot.

9. A spray booth as defined in claim 2 wherein said operating means are arranged for displacing said scraping bar alternatingly along said lower surface of said ceiling toward said inner face of one of said walls and vertically along said inner face of said one of said walls.

10. A spray booth as defined in claim 2 wherein two of said walls are perpendicular to one another, there are two said scraping bars each for scraping a respective one of said two walls, and said operating means are arranged to support and displace each of said two scraping bars.

11. A spray booth as defined in claim 10 wherein there is one said mobile element to which either one of said two scraping bars can be selectively coupled.

12. A spray booth as defined in claim 1 wherein said scraping bar is displaceable during spraying of the coating material.

13. A spray booth as defined in claim 1 wherein said operating means constitute means for effecting translational displacement of said scraping bar.

* * * * *